Patented Jan. 16, 1923.

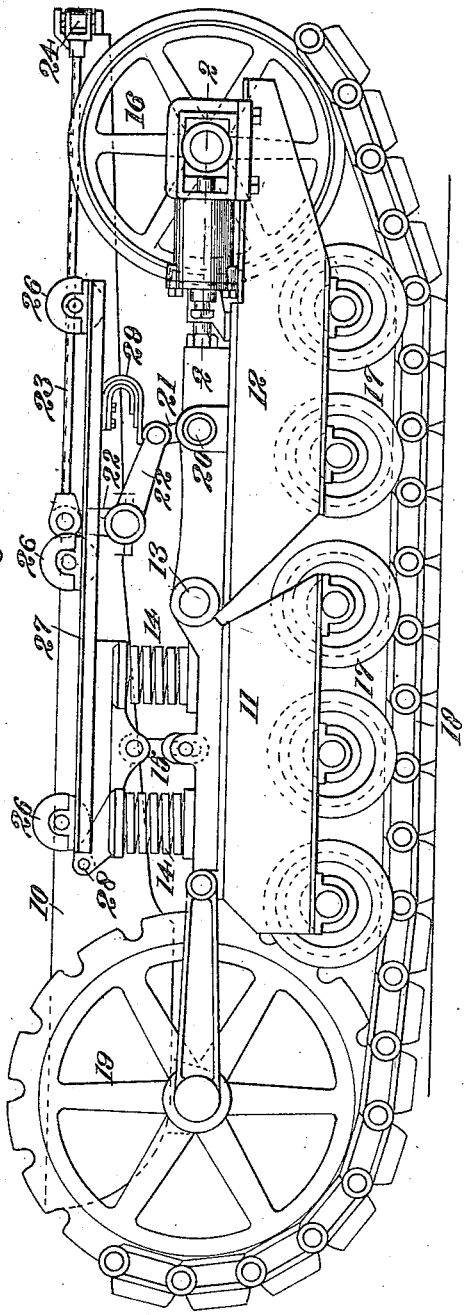

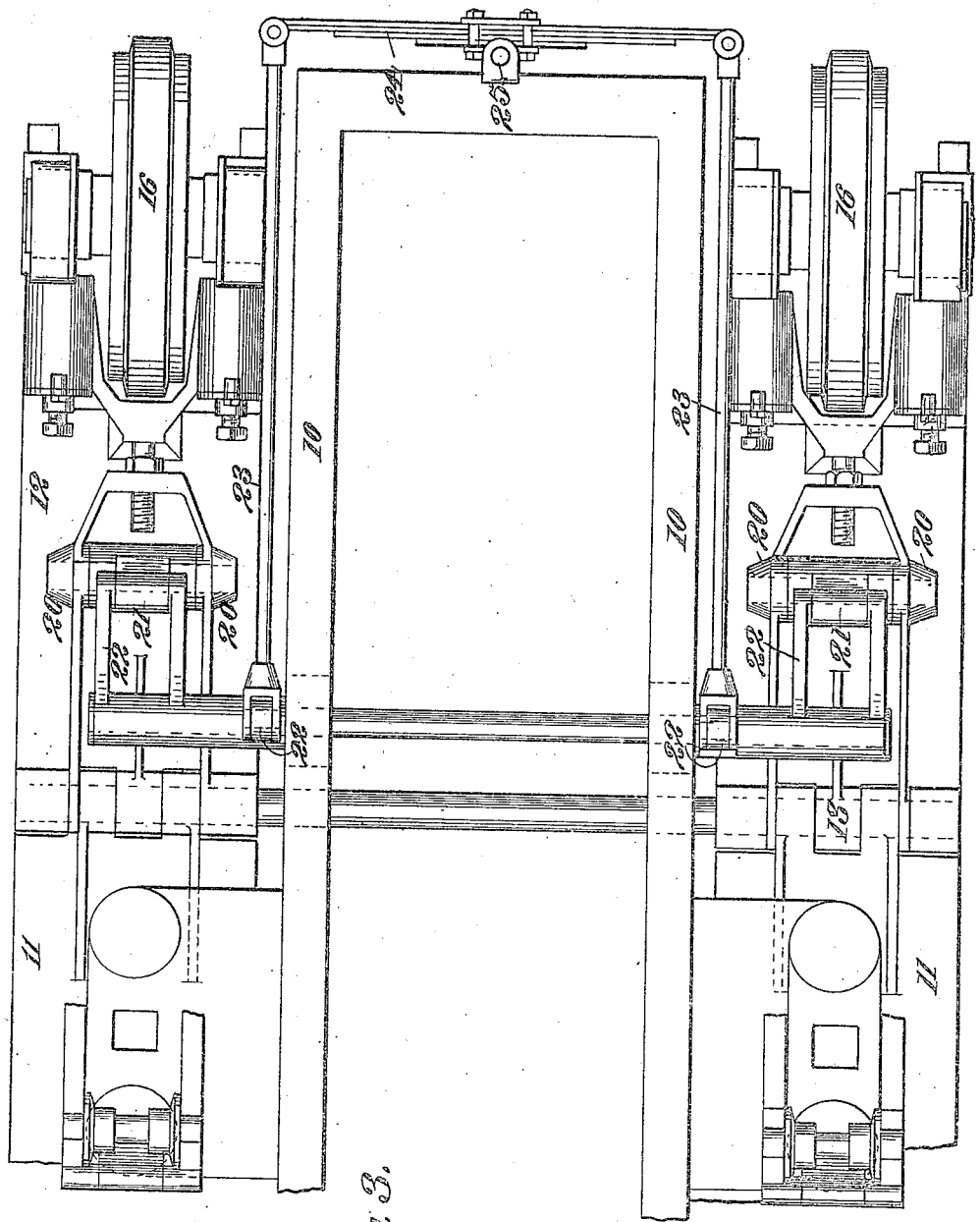

1,442,568

UNITED STATES PATENT OFFICE.

PLINY E. HOLT, OF STOCKTON, CALIFORNIA, ASSIGNOR TO THE HOLT MANUFACTURING COMPANY, OF STOCKTON, CALIFORNIA, A CORPORATION OF CALIFORNIA.

SPRING EQUALIZER.

Application filed September 3, 1919. Serial No. 321,434.

*To all whom it may concern:*

Be it known that I, PLINY E. HOLT, a citizen of the United States, residing at Stockton, in the county of San Joaquin and State of California, have invented new and useful Improvements in Spring Equalizers, of which the following is a specification.

This invention relates to tractors of the chain track type, and more particularly to an equalizing arrangement for the truck members.

The object of this invention is to permit the main frame to be hung low as is desirable in small tractors used for orchard work and the like. To accomplish this object, I provide an equalizer bar pivoted to the front of the end piece of the main frame on a vertical pivot and connect each end of the equalizer bar to the adjacent truck mechanism by suitable connections such that an upward movement of one of the truck mechanisms will, through the medium of the equalizer bar, impart a downward movement to the opposite truck mechanism.

Referring to the accompanying drawings:

Fig. 1 shows a side elevation of a device embodying my invention.

Fig. 2 shows a plan view, partly in section, of a forward portion of one of the truck members.

Fig. 3 shows a plan view of the forward portion of the main frame and opposite truck mechanisms.

The tractor herein illustrated comprises a main frame 10, at each side of which is arranged a chain track truck mechanism, each comprising a rear truck frame member 11 and a forward truck frame member 12, hinged together at 13. The rear truck frame member 11 supports the main frame through coil springs 14 and is free to rock about the connection 15 therewith. The forward truck frame member 12 carries an idler sprocket wheel 16 and is connected to the main frame in a manner to permit rocking movement of the truck frame independently of the main frame by means of the equalizing connections about to be described.

Each truck frame carries a series of rollers 17. An endless chain track 18 is driven by a toothed sprocket wheel 19, the latter being journaled directly on the main frame, said chain passing beneath the rollers 17 and around the idler wheel 16.

The foregoing is susceptible of wide modification and is shown and described merely for the purpose of illustrating one application of my invention.

The forward truck frame member 12 has fixed upon it a bearing 20 in which is journaled a crank arm 21. This crank arm is pivotally connected to a bell-crank lever 22, mounted upon the main frame. The opposite end of the bell-crank lever is connected by means of a link 23 to a leaf spring 24, at the forward end of the main frame. This leaf spring is carried by the main frame on a vertical pivot 25 at its center.

In operation, when one of the truck mechanisms meets with an obstruction or rise in the ground it is lifted thereby. This upward movement is transmitted through the bell-crank 22 and leaf spring 24 to the opposite truck mechanism, imparting a downward thrust to the latter. By employing a spring 24 as an equalizer bar it will be seen that in case the truck mechanism, to which the downward thrust has been imparted, should not be free to move downwardly on account of the condition of the ground, then the movement of the rising truck member will be taken up by the flexibility of the spring 24 and as a consequence no shock will be imparted to the main frame.

The upper run of the chain track is supported on the rollers 26 journaled on a bar 27, the latter being pivoted to the main frame at 28. The forward portion of said bar 27 is supported by means of a curved spring 29 resting upon the crank arm 21.

Various changes in the construction and arrangement of the several parts herein shown and described may be employed without departing from the spirit of my invention as disclosed in the appended claims.

Having thus described my invention, what I claim and desire to secure by Letters Patent is—

1. In a tractor construction, the combination with a main frame, a truck frame at each side thereof pivoted for rocking movement in a vertical plane and a suspension means for the main frame remote from said pivoted connections comprising a equalizer bar pivoted centrally of the main frame on a vertical pivot, a bell crank lever carried by the main frame at each side thereof, a link connecting one end of each bell crank lever with the adjacent end of the equalizer bar and a link connecting the other end of the bell crank lever with the adjacent truck frame.

2. In a tractor construction, the combination with a main frame, a truck frame at each side thereof pivoted for rocking movement in a vertical plane and suspension means for the main frame remote from the said pivoted connections comprising a leaf spring equalizer bar pivoted centrally to the main frame on a vertical pivot, a bell crank lever carried by the main frame at each side thereof, a rigid link between one end of each bell crank lever and the adjacent end of the equalizer bar and a movable connection between the other end of each bell crank lever and the adjacent truck frame.

In testimony whereof I have hereunto set my hand in the presence of two subscribing witnesses.

PLINY E. HOLT.

Witnesses:
CHARLES L. NEUMILLER,
DAVID B. LYMAN.